United States Patent [19]
Peterson

[11] 3,980,913
[45] Sept. 14, 1976

[54] MAGNETIC SPEED SENSOR
[75] Inventor: Arnold Duane Peterson, Bainbridge, N.Y.
[73] Assignee: The Bendix Corporation, Southfield, Mich.
[22] Filed: Mar. 20, 1975
[21] Appl. No.: 560,075

[52] U.S. Cl. ................................. 310/155; 310/168
[51] Int. Cl.² .................................... H02K 21/38
[58] Field of Search ............ 310/155, 168, 216–218; 338/32 H; 324/124

[56] References Cited
UNITED STATES PATENTS

| | | | |
|---|---|---|---|
| 1,977,600 | 10/1934 | Winther | 310/218 X |
| 2,718,603 | 9/1955 | McLean | 310/155 |
| 3,158,033 | 11/1964 | Cohen | 310/155 X |
| 3,230,407 | 1/1966 | Marsh, Jr. | 310/168 |
| 3,252,024 | 5/1966 | Loudon | 310/155 |
| 3,738,175 | 6/1973 | Linsig | 338/32 H |
| 3,793,545 | 2/1974 | Leiber et al. | 310/168 |
| 3,876,927 | 4/1975 | Gee et al. | 310/155 X |

*Primary Examiner*—Donovan F. Duggan
*Attorney, Agent, or Firm*—S. H. Hartz

[57] ABSTRACT

A device for providing signals corresponding to rotation of a body having a magnetic sensor with a sensing pole positioned proximate to a tone wheel rotated by the rotating body. A permanent magnet is attached to the sensing pole and a signal voltage having a frequency proportional to the speed of the rotating body is induced in a coil surrounding the sensing pole. The sensing pole is made of square loop magnetic material and is shaped and arranged to cause the magnetomotive force difference between its pole face and the tone wheel to decrease as the air gap length between them decreases, thus causing the normally large change in sensor output with air gap length variation to be substantially reduced.

21 Claims, 8 Drawing Figures

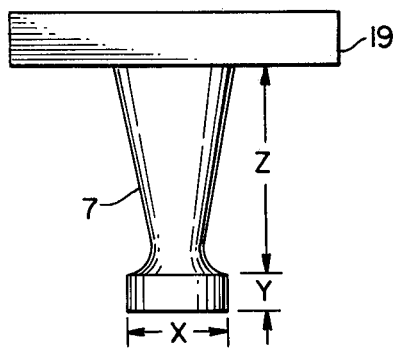
FIG. 3
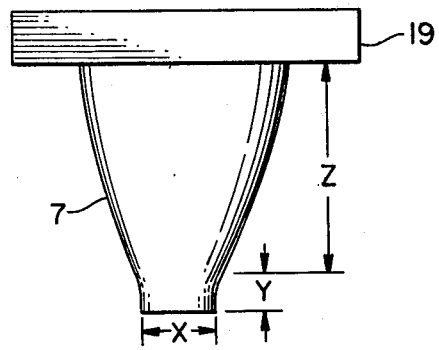
FIG. 4
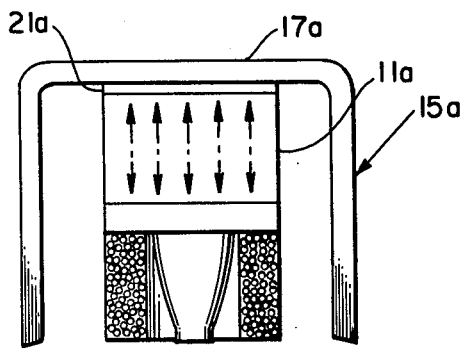
FIG. 5
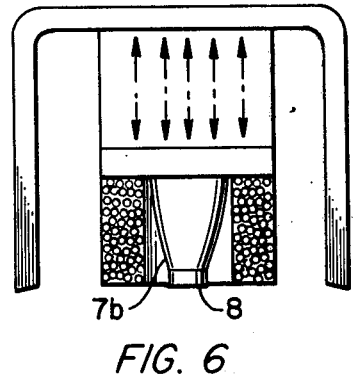
FIG. 6
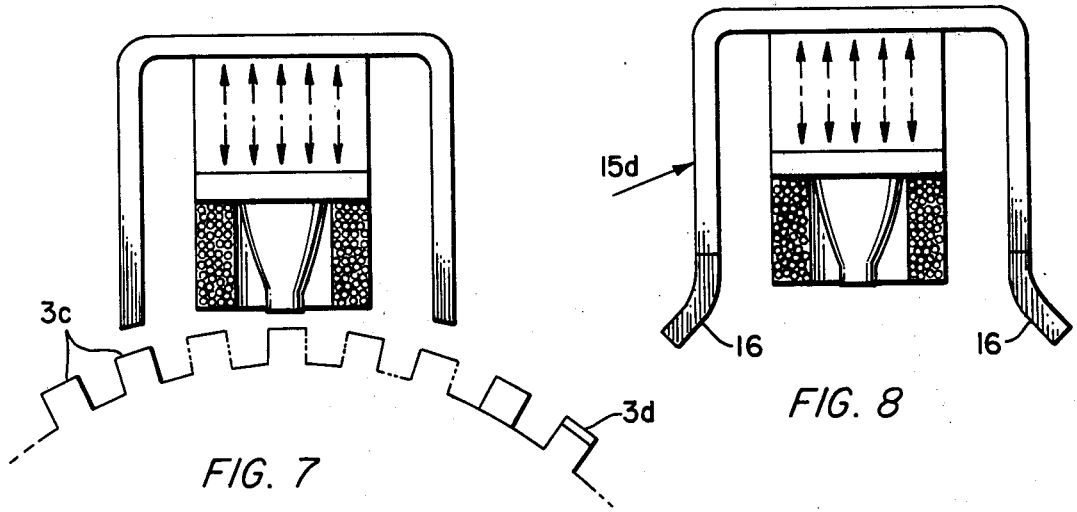
FIG. 7
FIG. 8

MAGNETIC SPEED SENSOR

The invention relates to devices which sense rotation of a body and provide electrical signals corresponding to a variable parameter, such as angular speed or angular position.

PRIOR ART

Wheel speed sensors as used heretofore for adaptive braking systems described in U.S. Pat. No. 3,494,671, generate a signal which varies in frequency in accordance with the speed of the vehicle wheel. The wheel speed sensor comprises a tone wheel, which rotates with the vehicle wheel, and a stationary magnetic pick-up assembly. One of the difficulties encountered in these devices is that variations in air gap length between the tone wheel and pick-up result in large variations in speed signal amplitude.

The amplitude of the signal generated by a magnetic pick-up is directly proportional to the difference between the in-register and out-of-register permeances of the air gap between pick-up pole piece and tone wheel and to the magnetomotive force gradient between them. This magnetomotive force gradient is, to a first approximation, independent of air gap length and pole tip to tone wheel registration position because the leakage permeance seen by the magnet is normally large compared with the permeance of the working gap – return path circuit.

The magnet's operating point is thus largely determined by its essentially constant leakage permeance resulting in a source (magnet) magnetomotive force which may be regarded as nearly independent of working gap length and tone wheel registration position. In actual practice, this magnetomotive force increases somewhat with decreasing gap length and, if the tone wheel's slot width substantially exceeds its tooth width, the magnetomotive force is somewhat less in the in-register than in the out-of-register position.

Part of this nearly constant source magnetomotive force is dropped across the magnet to tone wheel flux return path and the remainder, assuming no significant air gap between magnet and pole piece and negligible pole piece saturation magnetomotive force drop, appears across the working gap (between tone wheel and pick-up pole piece). This latter magnetomotive force component, referred to as gap magnetomotive force, is substantially independent of gap length and tone wheel registration position.

As the tone wheel rotates, the gap permeance varies from maximum (in-register) to minimum (out-of-register). The fixed gap magnetomotive force applied across this varying permeance results in an A. C. component of flux in the pole piece which links the turns of the coil thus generating an output signal proportional to speed. When the air gap is large, the difference between the in-register and out-of-register gap permeances is slight while for a small gap, it is very much larger. This large variation in differential gap permeance over the full range of air gap length, coupled with the relative constancy of gap magnetomotive force, causes the A.C. flux component, and thus the output signal, to be greatly dependent upon air gap length in an ordinary pick-up.

One solution to this problem, of course, is to reduce output signal variation caused by variation in the air gap between the tone wheel and pick-up by adhering to closer pick-up manufacturing and installation tolerances but this would make the parts considerably more expensive to manufacture and employ.

SUMMARY OF THE INVENTION

The present invention reduces variations in signal amplitude resulting from changes in the air gap between the tone wheel and pick-up by causing the gap magnetomotive force (magnetomotive force difference between pick-up pole face and tone wheel) to diminish as the air gap is reduced thus compensating for the increase in in-register to out-of-register differential permeance.

As noted above the total, and essentially constant, source (magnet) magnetomotive force is normally shared only by the magnet to tone wheel flux return path and the pole face to tone wheel air gap because there are no additional magnetomotive force drops in the working gap magnetic circuit of a conventional pick-up.

The present invention introduces a third, and variable, magnetomotive force drop in this magnetic circuit by means of controlled pole piece saturation. D.C. flux in the pole piece, which tends to increase with decreasing air gap length, causes a saturation magnetomotive force drop across the length of the pole piece, which drop increases with decreasing gap length. Since this pole piece saturation magnetomotive force drop subtracts from the fixed source magnetomotive force, the magnetomotive force available to the working gap is diminished as the gap length is decreased. This decrease in gap magnetomotive force with decreasing gap length compensates for the increase in the in-register to out-of-register differential permeance resulting in an A.C. flux linking the pick-up coil which is much less dependent upon gap length than that in a conventional pick-up. The result is an output signal which varies much less with variations in air gap length than does that of a conventional pick-up with a non-saturating pole.

The pole piece of the present invention functions as a magnetomotive force regulator which creates an increasing magnetomotive force drop across itself as the D.C. flux through it tends to increase, thus automatically decreasing the gap magnetomotive force as the gap length is decreased. The effectiveness of this regulating action is maximized by employing a square loop material for the pole piece, shaping the pole piece profile for constant D.C. flux density along its full length (excluding pole tip) for the maximum operating gap condition, and sizing the pole piece cross sectional area for a D.C. flux density, also at maximum gap, which is slightly below the "knee" of the D.C. magnetization curve of the square loop pole material.

Since the pole piece D.C. flux density for the maximum operating air gap condition must be slightly below the "knee" of the D.C. magnetization curve of the square loop pole piece material in order to maximize the pick-up signal at maximum gap while effectively limiting it at lesser gaps, it is necessary to provide compensation for the large negative temperature coefficient of saturation induction exhibited by such materials if the pick-up is to operate over a wide temperature range. The required compensation is a reduction in the air gap magnetomotive force with increasing temperature which approximately matches the decrease in saturation induction of the square loop pole piece material to assure that the pole piece D.C. flux density at maximum operating air gap remains slightly below the "knee" of its D.C. magnetization curve at all temperatures. This is accomplished by means of a suitable series element of "Curie metal" in the working gap magnetic circuit, i.e., between pole piece and magnet, at the pole tip, or in the flux return path; or by use of a permanent magnet, such as a Ferrite type, which possesses a large reversible temperature coefficient of induction.

The above described temperature compensation prevents the operating point on the D.C. magnetization curve of the square loop material from rising above the "knee" at elevated temperatures which would result in a substantial reduction of maximum gap signal.

The invention contemplates a device for providing signals corresponding to rotation of a rotating body, comprising a tone wheel rotated by the rotating body, a magnetic sensor having a sensing pole proximate the tone wheel, coil means surrounding the sensing pole, means for magnetizing the sensing pole to induce a signal voltage in the coil means corresponding to the rotation of the rotating body, and means for automatically controlling the magnetomotive force gradient between the sensing pole and the tone wheel to minimize variations in signal voltage amplitude normally caused by variations in the distance between the sensing pole and the tone wheel.

The means for controlling the magnetomotive force gradient between the sensing pole and tone wheel includes shaping and sizing the cross section of the sensing pole to provide substantially constant d.c. flux density just below the "knee" of its d.c. magnetization curve throughout substantially the entire length of the sensing pole when the tone wheel is in the in-register position and the air gap is at maximum. The sensing pole preferably is made of square loop magnetic material having a d.c. magnetization curve with a sharp "knee" at saturation.

Means is provided to compensate for the relatively large negative temperature coefficient of saturation induction of the square loop magnetic material, either by the use of a series element of Curie metal in the working gap magnetic circuit or by the use of a permanent magnet having a large reversible temperature coefficient of induction, to provide a reduction in gap magnetomotive force with increasing temperature.

DRAWINGS

FIG. 1 is a schematic drawing of a magnetic pick-up constructed according to the invention, FIG. 2 shows a D.C. magnetization curve for a square loop magnetic material, FIGS. 3 and 4 show several profiles for the sensing pole, and FIGS. 5, 6, 7 and 8 are views similar to FIG. 1 showing other embodiments of the invention.

DETAILED DESCRIPTION OF THE INVENTION

Figure 1:
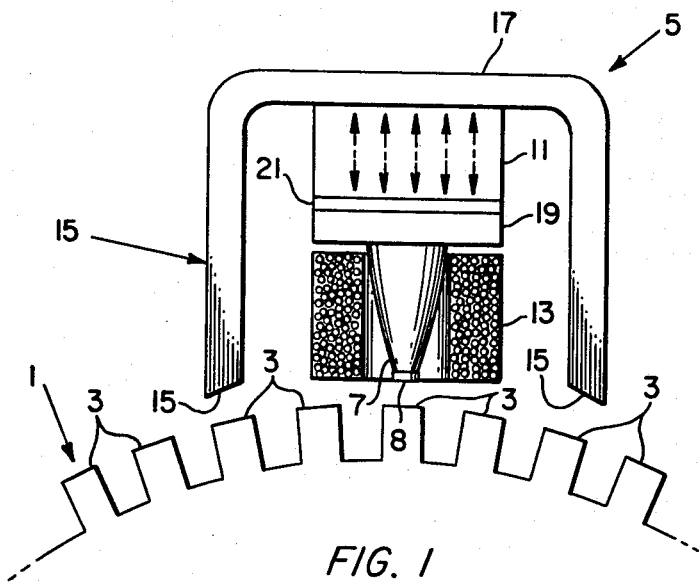

Referring to FIG. 1 of the drawings, the magnetic pick-up device shown therein and constructed according to the invention includes a tone wheel or vane wheel 1 of magnetic material having a series of teeth 3 about its periphery. For speed sensing, as required in adaptive braking systems for example, the number of teeth is typically large as shown and they are equally spaced. For position sensing, as required in ignition systems for example, the number of teeth may be as few as one and spacing may or may not be uniform. The term tone wheel as used herein is intended to be all inclusive. The tone wheel is attached to a rotating body or shaft, the speed or angular position of which is to be sensed.

A magnetic sensor 5 has a sensing pole 7 positioned adjacent teeth 3 of tone wheel 1 and secured to one pole of a permanent magnet 11. A coil 13 surrounds the sensing pole 7 and provides electrical signals having a frequency corresponding to the speed of the tone wheel. A high permeance flux path from the magnet's other pole to the tone wheel may be provided by means of a ferromagnetic member 15 which can take the form of either a U-shaped structure or a cup entirely containing the magnet, sensing pole and coil, in which latter case the cup type flux return member may serve as the pick-up housing. In some instances it may be desirable to omit member 15 entirely, utilizing the various stray permeance paths from the magnet to the tone wheel for the flux return portion of the working gap magnetic circuit.

In the embodiment shown, the base 17 of the U-shaped structure 15 is attached to one pole of permanent magnet 11 and the legs of the U are positioned adjacent teeth 3 of the tone wheel 1.

Sensing pole 7 is made of square loop magnetic material. The entire sensing pole may be made from a single piece of square loop magnetic material or it may be fabricated using a square loop magnetic material for the pole body and a soft ferromagnetic material for the pole base 19 and/or pole tip 8.

Figure 2:
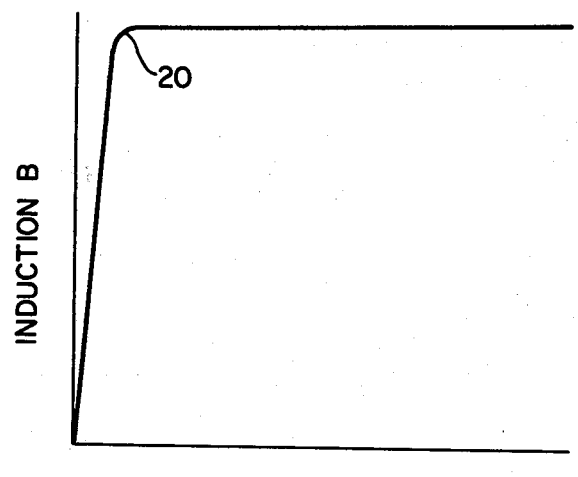

Approximate sensing pole profiles are shown in FIGS. 3 and 4 for HiPerm 49 and HYMU 80, respectively, manufactured by Carpenter Technology Corporation, Reading, Pa. The pole body Z should be tapered for constant D.C. flux density just below the "knee" 20 of the D.C. magnetization curve shown in FIG. 2 under the maximum operating gap condition with a tone wheel tooth in registry with the sensing pole. The depth Y of the pole tip should be substantially constant at whatever X dimension is required to yield the desired tone wheel pole tip/air gap geometry. The pole base 19 preferably has the same shape as magnet 11. The pole tip and body preferably are circular in cross section although any desired shape can be used.

Square loop magnetic material has a relatively large negative temperature coefficient of saturation induction. Therefore temperature compensation of the magnetic circuit to reduce the air gap magnetomotive force at elevated temperature is necessary to avoid changes in signal amplitude when the device is to be operated over a wide temperature range. One means of accomplishing this gap magnetomotive reduction with increasing temperature is the insertion of a series element of Curie metal in the working gap magnetic circuit. The Curie metal element is chosen to have a Curie temperature somewhat higher than the maximum operating temperature of the sensor and the length of the magnetic path through the element is a function of the temperature coefficient of saturation induction of the square loop material. At low temperatures the Curie metal temperature compensation element has a high permeability resulting in maximum gap magnetomotive force. As the temperature increases its permeability decreases resulting in decreased gap magnetomotive force. The flux density in the sensing pole is consequently lowered thus compensating for the reduced saturation induction of the square loop material of which it is made. Suitable Curie metals are Carpenter Technology Corporation's various temperature compensating alloys and their Invar 36.

Specific design and application considerations may dictate employment of the temperature compensation element in a variety of configurations and at various points in the working gap flux circuit. In FIG. 1 the Curie metal temperature compensation element 21 is shown between magnet 11 and base 19 of pole piece 7. In FIG. 5 the Curie metal temperature compensation element 21a is positioned between the permanent magnet 11a and the base 17a of the Ferromagnetic flux return member 15a. In FIG. 6 the tip 8 of sensing pole 7b is the Curie metal temperature compensation element. In FIG. 7 either the entire tone wheel, the tone wheel teeth 3c, or their tips 3d are made of Curie metal. In FIG. 8 either the entire flux return member 15d or some portion thereof, such as ends 16 are made of Curie metal.

Temperature compensation may also be possible, under certain design and application conditions, through the use, for magnet 11, of a Ferrite (ceramic) magnet or other magnetic material having a large reversible temperature coefficient of induction to provide a reduction in gap magnetomotive force with increasing temperature.

The present invention minimizes changes in signal amplitude caused by variation in the air gap between the tone wheel and sensor by varying the air gap magnetomotive force inversely with air gap length. This is done by using square loop magnetic material for the sensing pole. The square loop magnetic material has a direct current magnetization curve with a sharp "knee" at saturation. The cross section of the sensing pole is shaped and sized to provide constant flux density just below the "knee" of the magnetization curve through substantially the entire length of the sensing pole when a tone wheel tooth is in registry with the sensing pole and the air gap is maximum. The magnetomotive force drop in the sensing pole varies inversely with the length of the air gap to compensate for changes in the length of the air gap.

What is claimed is:

1. A device for providing signals corresponding to rotation of a rotating body, comprising a tone wheel rotated by the rotating body, a magnetic sensor having a sensing pole proximate the tone wheel, coil means surrounding the sensing pole, means for magnetizing the sensing pole to induce a signal voltage in the coil means corresponding to the rotation of the rotating body, and means for automatically controlling the magnetomotive force gradient between the sensing pole and the tone wheel to minimize variations in signal voltage amplitude normally caused by variations in the length of the air gap between the sensing pole and the tone wheel.

2. A device for providing signals corresponding to rotation of a rotating body as described in claim 1 in which the means for controlling the magnetomotive force gradient between the sensing pole and the tone wheel includes means for providing a magnetomotive force drop across the sensing pole which varies inversely with the air gap.

3. A device for providing signals corresponding to rotation of a rotating body as described in claim 2 in which the means for controlling the magnetomotive force gradient between the sensing pole and tone wheel includes shaping and sizing the cross-section of the sensing pole to provide substantially constant flux density just below the "knee" of its d.c. magnetization curve throughout substantially the entire length of the sensing pole when the tone wheel is in the inregister position and the air gap is maximum.

4. A device for providing signals corresponding to rotation of a rotating body as described in claim 3, in which the sensing pole is made of material having a direct current magnetization curve with a sharp "knee" at saturation.

5. A device for providing signals corresponding to rotation of a rotating body as described in claim 4, in which the sensing pole is made of square loop magnetic material 6. A device for providing signals corresponding to rotation of a rotating body as described in claim 5, in which the means for magnetizing the sensing pole is a permanent magnet.

7. A device for providing signals corresponding to rotation of a rotating body as described in claim 6, having a Ferromagnetic flux return member to provide a high permeance flux path from the magnetic pole opposite the sensing pole to the tone wheel.

8. A device for providing signals corresponding to rotation of a rotating body as described in claim 7, in which the flux return member has a U-shaped configuration.

9. A device for providing signals corresponding to rotation of a rotating body as described in claim 7, in which the sensing pole is connected to one pole of the permanent magnet and the ferromagnetic flux return member is attached to the other pole of the permanent magnet.

10. A device for providing signals corresponding to rotation of a rotating body as described in claim 5, in which the sensing pole has a tapered body profile and a tip of substantially constant dimensions attached to the body.

11. A device for providing signals corresponding to rotation of a rotating body as described in claim 10, in which the sensing pole cross-section is of a size and profile to provide a uniform D.C. pole flux density which is just below the "knee" of its D.C. magnetization under the maximum operating air gap condition.

12. A device for providing signals corresponding to rotation of a rotating body as described in claim 11, having means connected in series with the magnetic circuit to minimize changes in signal amplitude with changes in temperature.

13. A device for providing signals corresponding to rotation of a rotating body as described in claim 12, in which the means for minimizing changes in signal amplitude with changes in temperature is a Curie metal element connected in series with the working gap magnetic circuit.

14. A device for providing signals corresponding to rotation of a rotating body as described in claim 13, in which the Curie metal element is positioned between the sensing pole and the permanent magnet.

15. A device for providing signals corresponding to rotation of a rotating body as described in claim 9, having an element of Curie metal positioned between the permanent magnet and the ferromagnetic flux return member.

16. A device for providing signals corresponding to rotation of a rotating body as described in claim 13, in which the tip of the sensing pole is formed of Curie metal to minimize changes in signal amplitude with changes in temperature.

17. A device for providing signals corresponding to rotation of a rotating body as described in claim 13, in which at least a portion of the tone wheel is made of Curie metal.

18. A device for providing signals corresponding to rotation of a rotating body as described in claim 9, in which at least a portion of the ferromagnetic flux return member is made of Curie metal.

19. A device for providing signals corresponding to rotation of a rotating body as described in claim 11, in which the permanent magnet is of magnetic material having a large reversible temperature coefficient of induction to provide decreasing air gap magnetomotive force with increasing operating temperature.

20. A device for providing signals corresponding to rotation of a rotating body as described in claim 6, in which the permanent magnet is of magnetic material having a large reversible temperature coefficient of induction to provide decreasing air gap magnetomotive force with increasing operating temperature.

21. A device for providing signals corresponding to rotation of a rotating body as described in claim 5, having means connected in series with the magnetic circuit to minimize changes in signal amplitude with changes in temperature.

* * * * *